United States Patent
Lam et al.

(10) Patent No.: US 10,609,129 B2
(45) Date of Patent: Mar. 31, 2020

(54) METHOD AND SYSTEM FOR MULTI-TENANT RESOURCE DISTRIBUTION

(71) Applicant: Huawei Technologies Co., Ltd., Shenzhen (CN)

(72) Inventors: Jason T. S. Lam, Markham (CA); Chong Chen, Richmond Hill (CA); Lei Guo, Markham (CA); Xiaodi Ke, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 74 days.

(21) Appl. No.: 15/142,371

(22) Filed: Apr. 29, 2016

(65) Prior Publication Data

US 2017/0244784 A1 Aug. 24, 2017

Related U.S. Application Data

(60) Provisional application No. 62/297,673, filed on Feb. 19, 2016.

(51) Int. Cl.
*H04L 29/08* (2006.01)
*G06F 9/50* (2006.01)

(52) U.S. Cl.
CPC .......... *H04L 67/1008* (2013.01); *G06F 9/505* (2013.01); *G06F 9/5077* (2013.01)

(58) Field of Classification Search
CPC ..... H04L 67/1008; G06F 9/505; G06F 9/5077
USPC ....................................................... 709/226
See application file for complete search history.

(56) References Cited

U.S. PATENT DOCUMENTS

| 8,694,400 | B1 | 4/2014 | Certain et al. |
| 8,788,663 | B1 * | 7/2014 | Adogla ................ G06F 9/5038 709/225 |
| 9,712,463 | B1 * | 7/2017 | Hughes ............... H04L 67/1097 |
| 9,804,890 | B1 * | 10/2017 | Pai .......................... G06F 9/455 |
| 2012/0137002 | A1 * | 5/2012 | Ferris .................... G06F 9/5072 709/226 |

(Continued)

FOREIGN PATENT DOCUMENTS

| CN | 104270421 A | 1/2015 |
| CN | 105022668 A | 11/2015 |

OTHER PUBLICATIONS

Swathi, S. et al, "Preemptive Virtual Machine Scheduling Using CLOUDSIM Tool", International Journal of Advances in Engineering, 2015, 1(3) Dec. 31, 2015 (Dec. 31, 2015), pp. 323-327.

*Primary Examiner* — James E Springer
(74) *Attorney, Agent, or Firm* — Slater Matsil, LLP

(57) ABSTRACT

In a distributed computing network, requests for allocation of resources to tenant workloads and messages identifying resource availability are received and aggregated. Resources are allocated to the workloads in accordance with a distribution policy defining values for resource entitlements of the tenants. The values include pre-emption quantities. In response to determining that a quantity of resources allocated for workloads of a first tenant is less than the tenant's pre-emption quantity, processing of another workload from a second tenant is interrupted to re-allocate resources from the second tenant's workload to the first tenant's workload.

23 Claims, 15 Drawing Sheets

(56) References Cited

U.S. PATENT DOCUMENTS

| | | | |
|---|---|---|---|
| 2012/0150912 A1* | 6/2012 | Ripberger | G06F 21/80 |
| | | | 707/786 |
| 2013/0014101 A1 | 1/2013 | Ballani et al. | |
| 2013/0046906 A1* | 2/2013 | Ripberger | G06F 3/0629 |
| | | | 710/12 |
| 2013/0138816 A1* | 5/2013 | Kuo | G06F 9/5011 |
| | | | 709/226 |
| 2013/0254407 A1 | 9/2013 | Pijewski et al. | |
| 2014/0137104 A1 | 5/2014 | Nelson et al. | |
| 2014/0207740 A1 | 7/2014 | Narasayya et al. | |
| 2014/0280956 A1* | 9/2014 | Shu | H04L 67/1004 |
| | | | 709/226 |
| 2014/0379924 A1 | 12/2014 | Das et al. | |
| 2015/0046279 A1 | 2/2015 | Wang | |
| 2017/0019345 A1* | 1/2017 | Yamasaki | G06F 9/46 |
| 2017/0199770 A1* | 7/2017 | Peteva | G06F 9/5088 |
| 2019/0288921 A1* | 9/2019 | Chan | H04L 43/0817 |

* cited by examiner

```
foreach (resource pool )
    aggregate demand from users
    aggregate demand from leaf tenants
    aggregate demand from tenants
    aggregate demand from root tenants
    adjust "reserve", "minimum", and "maximum" value by current
    resource pool size foreach (resource pool)
    assign available resource to "root" tenant
    distribute tenant (recursive)
        • distribute tenant (if non-leaf)
            o distribute sub-tenant's "reserve"
            o distribute sub-tenant's "minimum" up to "demand"
            o distribute sub-tenant's "share" up to "demand"
        • distribute user (if leaf)
            o distribute user's "weight" up to "demand"
        • at all times, constraint distribution to "maximum", and resource
          already "used" and previously "assigned"
```

FIG. 15

METHOD AND SYSTEM FOR MULTI-TENANT RESOURCE DISTRIBUTION

RELATED APPLICATIONS

This application claims priority from U.S. provisional patent application no. U.S. 62/297,673, filed on Feb. 19, 2016, the entire contents of which are incorporated herein by reference.

FIELD

This disclosure relates to distributed computing networks, and in particular, to resource allocation in distributed computing networks.

BACKGROUND

Modern computing systems typically house enormous amounts of data and have large and varied workloads. Distributed computing is therefore becoming increasingly important, particularly in the context of enterprise computing systems.

In a distributed computing environment, computing resources may be shared among multiple users, user groups, tenants or the like.

Large distributed computing systems typically have a large quantity of computing resources and support large user groups. Such environments typically provide fault tolerance and cost savings by spreading resources among many users.

However, increasing the number of resources and users tends to likewise increase the number and complexity of demands for system resources, which presents scheduling and resource allocation challenges.

Moreover, distributed computing systems may have diverse users and groups of users, with varied needs for resource quantity, service level, resource availability and cost, among other criteria.

SUMMARY

An example method of allocating resources in a distributed computing network comprising a plurality of tenants comprises: receiving a plurality of requests from the tenants for allocation of resource quantities to workloads from the tenants; allocating resources to the workloads in accordance with a distribution policy defining values for resource entitlements of the tenants, at least one of the values including a pre-emption quantity for a first tenant; and in response to determining that a first quantity of resources allocated for a workload of a first tenant is less than the pre-emption quantity for the first tenant, interrupting processing of a workload from a second tenant to re-allocate a second quantity of resources from the workload of the second tenant to the workload of the first tenant.

In some embodiments, the values comprise reserve quantities, and allocating resources comprises allocating a reserve quantity of resources to workloads from a tenant independently of a quantity of resources requested by the tenant.

In some embodiments, the values define maximum quantities of resources for at least some of the tenants, and allocating comprises allocating to a tenant its maximum quantity of resources, wherein the maximum quantity is less than a quantity of idle resources available for allocation to workloads from the tenant.

In some embodiments, the distribution policy comprises resource allocation weightings for users belonging to ones of the tenants.

In some embodiments, allocating resources comprises allocating resources to workloads from the users according to the weighting values.

In some embodiments, the values comprise proportional values each defining a proportional share of available resources.

In some embodiments, the tenants comprise a plurality of parent tenants, each with at least one child tenant, and the distribution policy defines hierarchical resource entitlements of the tenants, with entitlements of child tenants defined as proportional shares of parent tenants.

In some embodiments, the values comprise absolute values each defining a number of resource units.

In some embodiments, the values comprise proportional values defining a proportional value of available resources and absolute values defining a number of resource units.

In some embodiments, the distributed computing system comprises resources in a plurality of resource pools, and wherein the allocating comprises allocating resources of a first resource pool to a first set of tenants and allocating resources of a second resource pool to a second set of tenants.

In some embodiments, at least one tenant is part of both the first set of tenants and the second set of tenants.

In some embodiments, the method comprises defining a data structure defining a distribution policy for each one of the resource pools.

In some embodiments, interrupting a workload comprises selecting the second tenant from among the plurality of tenants based on a comparison of a resource entitlement of the second tenant and resources allocated to the second tenant.

Methods herein may include the above-noted features in any combination.

An example distributed computing system comprises a plurality of resource servers and a master server. The master server comprises: a resource collection module for receiving messages identifying available resources associated with the resource servers; a demand collection module for receiving messages identifying resource requests from tenants of the distributed computing system; a data structure comprising a distribution policy for the resources, the distribution policy containing values for resource entitlements of the tenants, the values comprising pre-emption values defining a quantity of the resources which can be allocated to a tenant by interrupting processing of a workload; and a distributed resource manager for allocating resources to workloads from the tenants according to the distribution policy.

In some embodiments, the values comprise reserve values each defining a minimum quantity of the resources to be allocated to a tenant.

In some embodiments, the values comprise maximum values defining a maximum quantity of resources to a tenant.

In some embodiments, the distribution policy comprises resource allocation weightings for users belonging to ones of the tenants.

In some embodiments, the values comprise proportional values each defining a proportional share of available resources.

In some embodiments, the tenants comprise a plurality of parent tenants, each with at least one child tenant, and the distribution policy defines heirarchical resource entitlements of the tenants, with entitlements of child tenants defined as proportional shares of parent tenants.

In some embodiments, the values comprise absolute values each defining a number of resource units.

In some embodiments, the values comprise proportional values each defining a proportional value of available resources and absolute values each defining a number of resource units.

In some embodiments, the resources comprise resources in a plurality of resource pools.

In some embodiments, the data structure comprises a distribution policy for each one of the resource pools.

In some embodiments, the distribution policy for a first one of the resource pools defines a first group of tenants with access to the first one of the resource pools, and the distribution policy for a second one of the resource pools defines a second group of tenants with access to the second one of the resource pools.

In some embodiments, at least one tenant is part of both the first and second groups.

Distributed computing systems herein may include the above-noted features in any combination.

BRIEF DESCRIPTION OF DRAWINGS

In the figures, which depict example embodiments,

FIG. 15 is an example of pseudo-code according to the distribution process of FIGS. 12-14.

DETAILED DESCRIPTION

Figure 1:
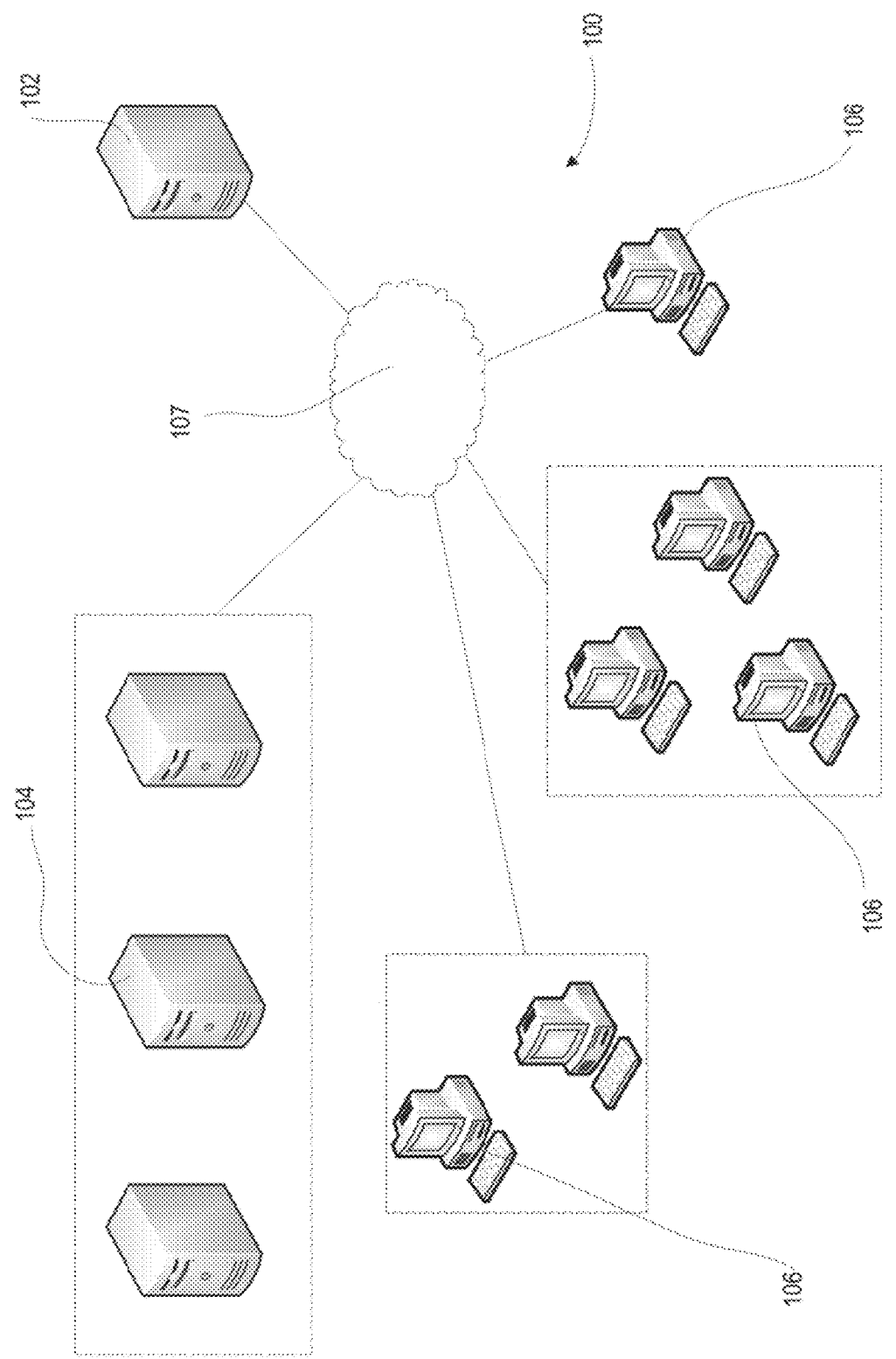
FIG. 1 is a schematic diagram of a computing system.

FIG. 1 illustrates aspects of an example computing system 100 to which aspects of the present disclosure can be applied.

Computing system 100 is a distributed computing system for distribution of computing resources among users and groups of users.

The computing system 100 includes a master server 102 and a plurality of resource servers 104. The computing environment further includes one or more client computing devices 106. As will be described in further detail, computing resources provided by resource servers 104 are shared among client computing devices 106. Client computing devices 106 can request resources for execution of workloads and master server 102 allocates resources for execution of such workloads.

Master server 102 is configured to distribute resources according to a distribution policy that allows for flexible distribution. In some embodiments the distribution policy allows for provision of resources at multiple service levels. For example, users or tenants share resources according to demand, to pre-empt other users or tenants from resources, or reserve resources for exclusive use. In some embodiments, features of the computing system 100 and distribution policy allow for easy scalability.

Computing system 100 can include any combination of hardware and software components. For example, a computing system 100 includes a combination of components such as computing devices, processors, networks, memories, storage devices, network devices, power sources, license servers (e.g., software license servers), swap space, and the like. In some embodiments, the computing system 100 is a heterogeneous or a homogenous environment, including different or similar hardware components running different or similar operating systems.

As depicted, master server 102, resource servers 104 and client computing devices 106 are interconnected via one or more networks 107, such as IPv4, IPv6, X.25, IPX compliant or similar networks, including one or more wired or wireless access points. The networks may include one or more local-area networks (LANs) or wide-area networks (WANs), such as the internet. In some embodiments, the networks are connected with other communications networks, such as GSM/GPRS/3G/4G/LTE networks.

Client computing devices 106 may be, for example, PCs, tablet computers, smartphones, or the like, based on Microsoft Windows, Apple OS X or iOS, Android, Linux, or other suitable operating systems. As depicted, client computing devices 106 are organized in one or more tenant groups 108 of associated computing devices. Tenant groups 108 may each be, for example, a set of client computing devices 106 belonging to a particular client, department, network (e.g. LAN), or other physical or logical grouping of client computing devices 106. As depicted, computing system 100 has three tenant groups, which include 2, 3 and 1 client computing devices 106, respectively. More or fewer tenant groups having more or fewer client computing devices 106 may be present.

Figure 2:
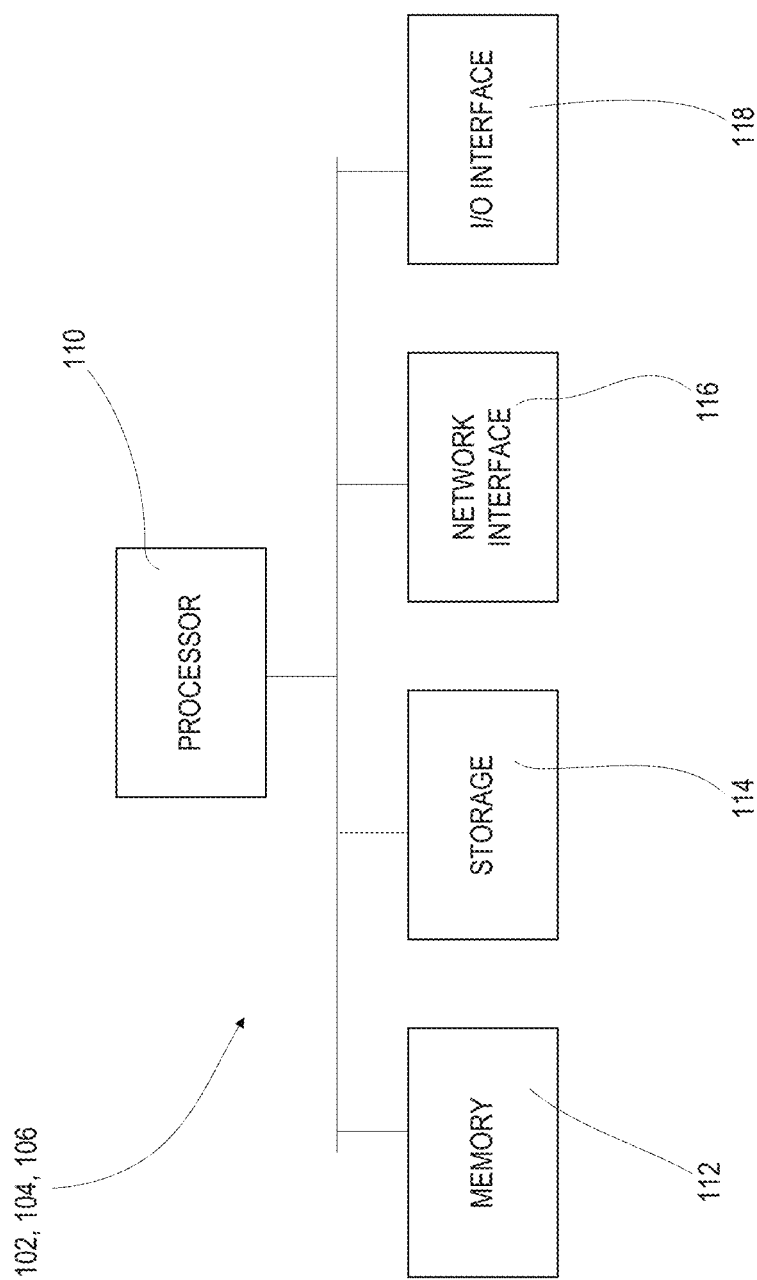
FIG. 2 is a block diagram of a computing device of the system of FIG. 1.

FIG. 2 is a block diagram of components of an example master server 102, resource server 104 or client computing device 106. As depicted, each master server 102, resource server 104, or client computing device 106 includes one or more processors 110, memories 112, persistent storage 114, network interfaces 116 and input/output interfaces 118.

Processor 110 may be an Intel or AMD x86 or x64, PowerPC, ARM processor, or the like. Processor 110 operates under control of software stored, for example, in persistent storage 114 and loaded in memory 112. Network interface 116 connects master server 102, resource server 104 or client computing device 106 to networks 107. I/O interface 118 further connects master server 102, resource server 104 or client computing device 106 to one or more peripherals such as keyboards, mice, USB devices, disc drives, graphics processing units (GPUs) and the like.

In the depicted embodiment, each one of master servers 102, resource servers 104 and client computing devices 106 is a separate physical device. In other embodiments, one or more of master servers 102, resource servers 104 and client computing devices 106 and components thereof are virtualized, that is, one or more of master servers 102, resource servers 104 and client computing devices 106 are virtual devices residing in software at another computing device. Virtualized machines are accessible by other ones of master servers 102, resource servers 104 and client computing devices for example by way of network 107.

Figure 3:
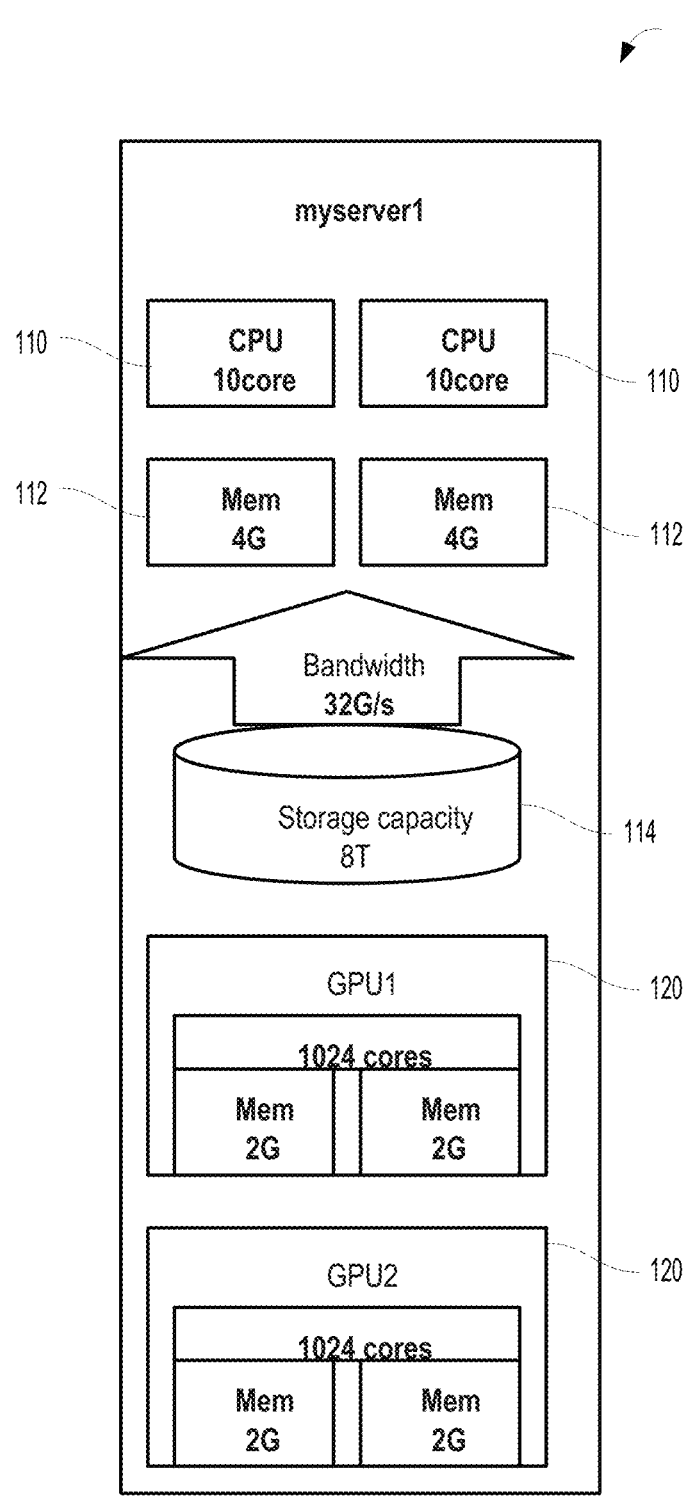
FIG. 3 is a block diagram of a resource server of the system of FIG. 1.

FIG. 3 depicts components of an example resource server 104 in greater detail. The server 104 has two processors 110. Each processor 110 has ten cores. The server 104 also has two 4 GB memory modules 112, and an 8 TB storage 114 having a bandwidth of 32 Gb/s. The server 104 also has two GPUs 120 named GPU1 and GPU2, each having 1024 cores and two 2 GB memory modules.

Software is be loaded onto server 102, for example from peripheral devices or from network 107, and executed using processor 110.

Figure 4:
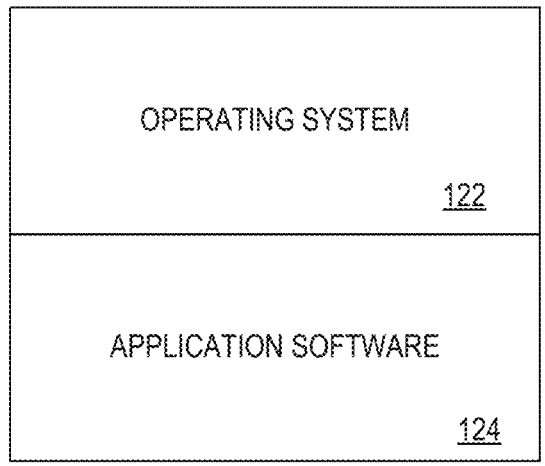
FIG. 4 is a block diagram of software at a computing device of the system of FIG. 1.
Figure 5:
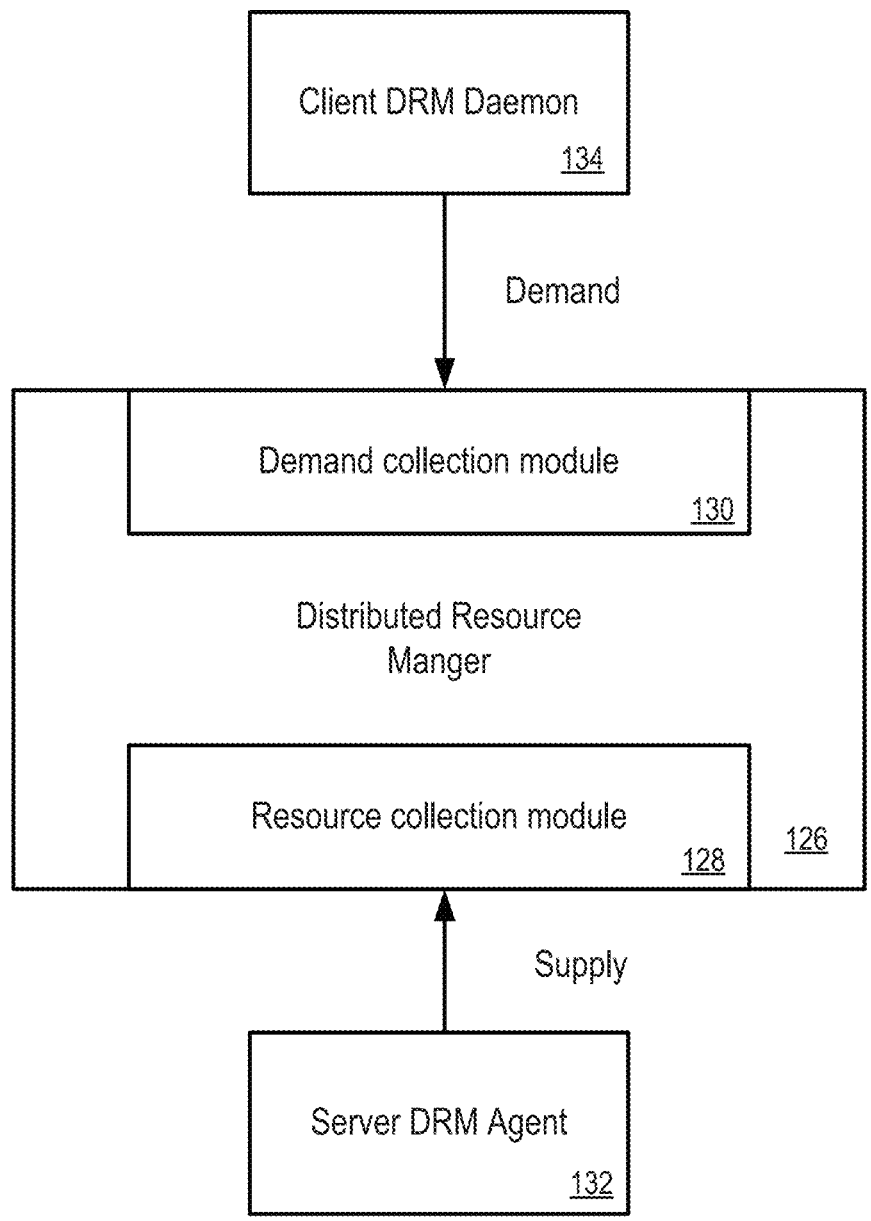
FIG. 5 is a schematic diagram of distributed resource management components of the system of FIG. 1.
Figure 6:
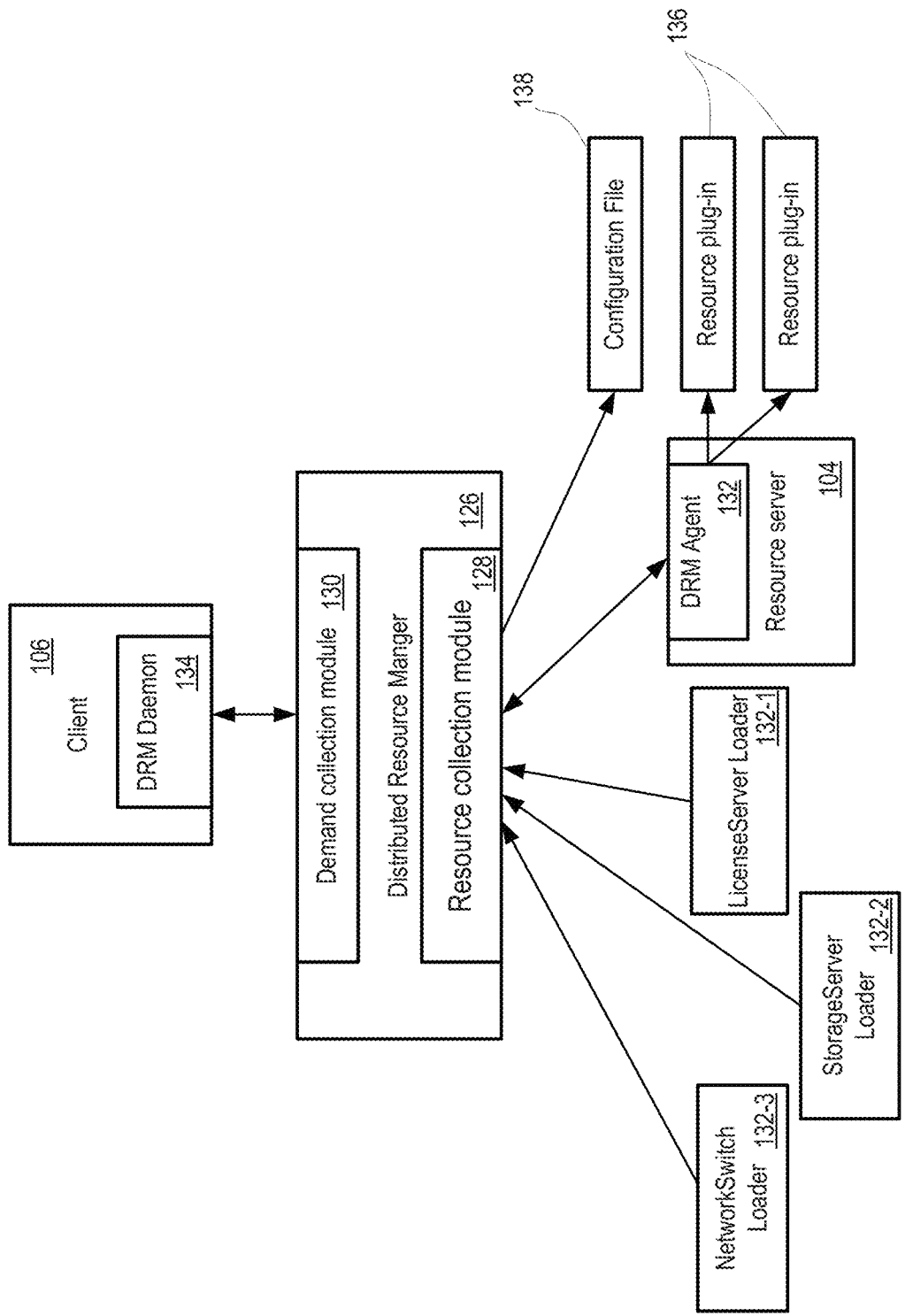
FIG. 6 is a schematic diagram showing the distributed management components of FIG. 5 in greater detail.

FIG. 4 depicts a simplified arrangement of software at each of master server 102, resource server 104 and client computing device 106. The software includes an operating system 122 and application software 124.

Operating system 122 may include Microsoft Windows, Apple OSX, Linux, or other suitable operating systems. Application software 124 runs within operating system software 122 for providing specific functions.

In some examples, application software 124 running at client computing devices 106 includes one or more applications, for example, word processors, spreadsheet programs, internet browsers, email clients, database programs or database front-ends, photo or video editors, 2D or 3D graphics programs, and the like. Application software 124 also includes one or more modules for directing workloads for allocation by master server 102 to one of resource servers 104. Such components may for example, be in the form of application program interfaces (APIs) or daemons, which direct program instructions to master server 102. As used herein, the term "daemon" refers to a software application that runs in the background on a computing device to take actions without direct explicit control by a user. For example, a daemon may intercept a call to a locally-running application and direct that call to master server 102.

Calls directed from client computing devices to master server 102 may comprise messages sent over network 107, including one or more data fields identifying a workload to be executed and resources required for the workload. For example, a workload may have specific (e.g. minimum) requirements for a number of Central Processing Units (CPUs), memory, storage, software licenses, network capabilities, etc.

Application software 124 running at master server 102 includes a distributed resource manager (DRM) 126 including a master daemon and scheduler. The daemon and scheduler can be responsible for interaction with client computing devices 106 (e.g., receiving workload submissions and queries). The daemon and scheduler can be further responsible for interaction with resource servers 104 (e.g. receiving messages identifying available resources and sending instructions to the resource servers).

DRM 126 further performs workload/resource scheduling. For example, as described in further detail below, DRM 126 aggregates demands for resources and resource availability information, and assign resources for performance of workloads from client computing devices 106.

Application software 124 running at resource servers 104 includes a DRM agent. The DRM agent monitors and reports resource availability to master server 102. DRM agents can be configured to accept requests from the client computing devices 106 (e.g. via the master server 102) to execute and control workloads at resource servers 104, and/or to monitor the life cycle of the workloads.

As depicted, DRM 126 includes a resource collection module 128 and a demand collection module 130. Resource collection module 128 communicates with DRM agents 132 at resource servers 104 over network 107 and receives messages indicative of the type, quantity and status (e.g. availability) of resources available at each resource server 104.

Demand collection module 130 communicates with DRM daemons at client computing devices 106 to receive requests for resource allocation.

Resources include, for example, any combination of processors or processor cores, memory, storage, graphics processors, network bandwidth, peripherals, or the like. In some embodiments, some resource servers 104 include plug-ins 136 for configuring resource servers 104 to handle specific workloads, such as workloads from specific applications. DRM agents 132 at resource servers 104 with such plug-ins are configured to communicate messages to resource collection module 128 indicative of the type, quantity and status of such plug-ins.

Some instances of DRM agents 132 communicate the status of resources other than computing resources of a resource serve 104. For example, DRM agent 132-1 includes a license server loader for communicating status (e.g. availability) of software licenses. DRM agent 132-2 includes a storage server loader for communicating status (e.g. availability, write-protect status) of a storage repository such as a database. DRM agent 132-3 includes a network switch loader for communicating status of network resources, e.g. bandwidth, network switches or ports of network switches. DRM agents 132-1, 132-2, 132-3 may reside at a resource server 104 or at master server 102.

Resource collection module 128 may maintain a configuration file 138 containing a record of resources available within computing system 100, based on messages received from DRM agents 132. In some embodiments, configuration file 138 contains records identifying locations of resources as residing at a particular location in network 107, e.g. at a specific resource server 104, in communication with a particular network switch, or as residing in a particular server rack or cluster, geographical area, or the like.

Demand collection module 130 receives messages from client computing devices 106 over network 107 indicative of demands for resources or requests for execution of workloads by users at client computing devices 106. Messages may identify, for example, applications to be run, data to be processed, retrieved or stored or the like.

Figure 7:
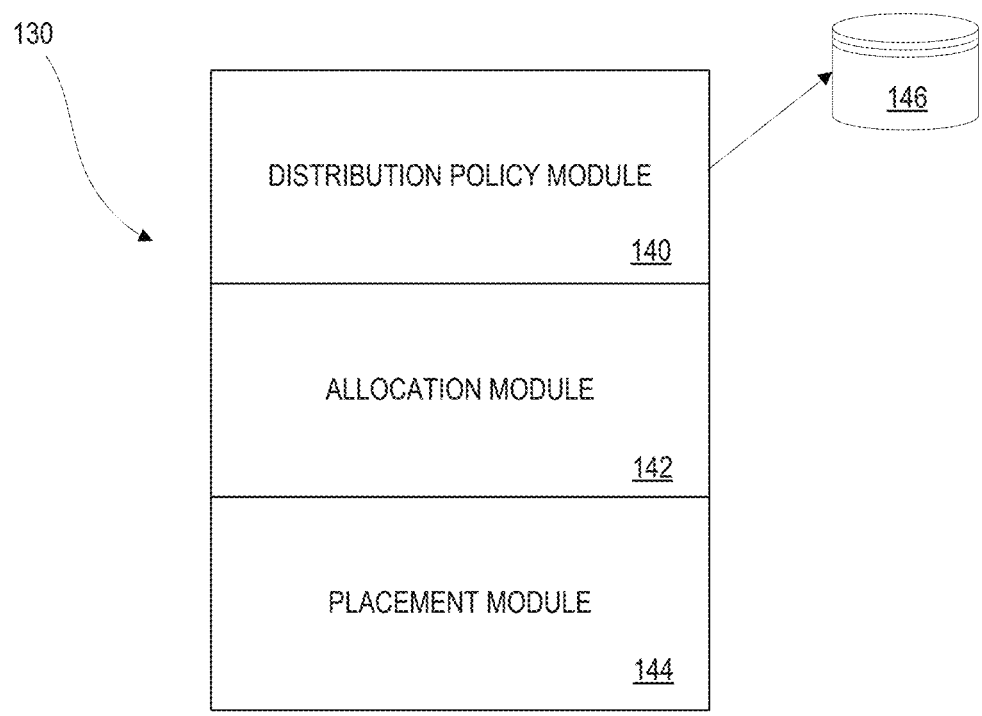
FIG. 7 is a schematic diagram of software at a master server of the system of FIG. 1.

FIG. 7 depicts components of demand collection module 130. As depicted, demand collection module 130 includes a distribution policy module 140, an allocation module 142 and a placement module 144. Distribution policy module 140 maintains a policy structure 146. Policy structure 146 is a data structure containing a series of rules for distribution of resources.

Allocation module 142 determines a distribution of resources to workloads associated with client computing devices 106 in accordance with a policy structure 146. That is, allocation module 142 determines the quantity of resources which are assigned to workloads. Placement module 144 is configured to match specific resources to specific workload requests in accordance with the distribution determined by allocation module 142.

As noted above, computing system 100 includes a number of tenants. As used herein, the term "tenant" refers to a group of resource-consuming units.

Tenants are organized in a tiered hierarchy. A tenant may have one or more sub-tenants. A tenant at the top hierarchical level is referred to as a root tenant. A tenant at the lowest hierarchical level is referred to as a leaf tenant. Individual users (e.g. individual client computing devices 106) may belong to leaf tenants. Sub-tenants belonging to a particular higher-level tenant are referred to as children of the higher-level tenant. Sub-tenants belonging to a higher-level tenant are referred to as "children" of the higher-level tenant. Conversely, the higher-level tenant is referred to as the "parent" of its sub-tenants.

Figure 8:
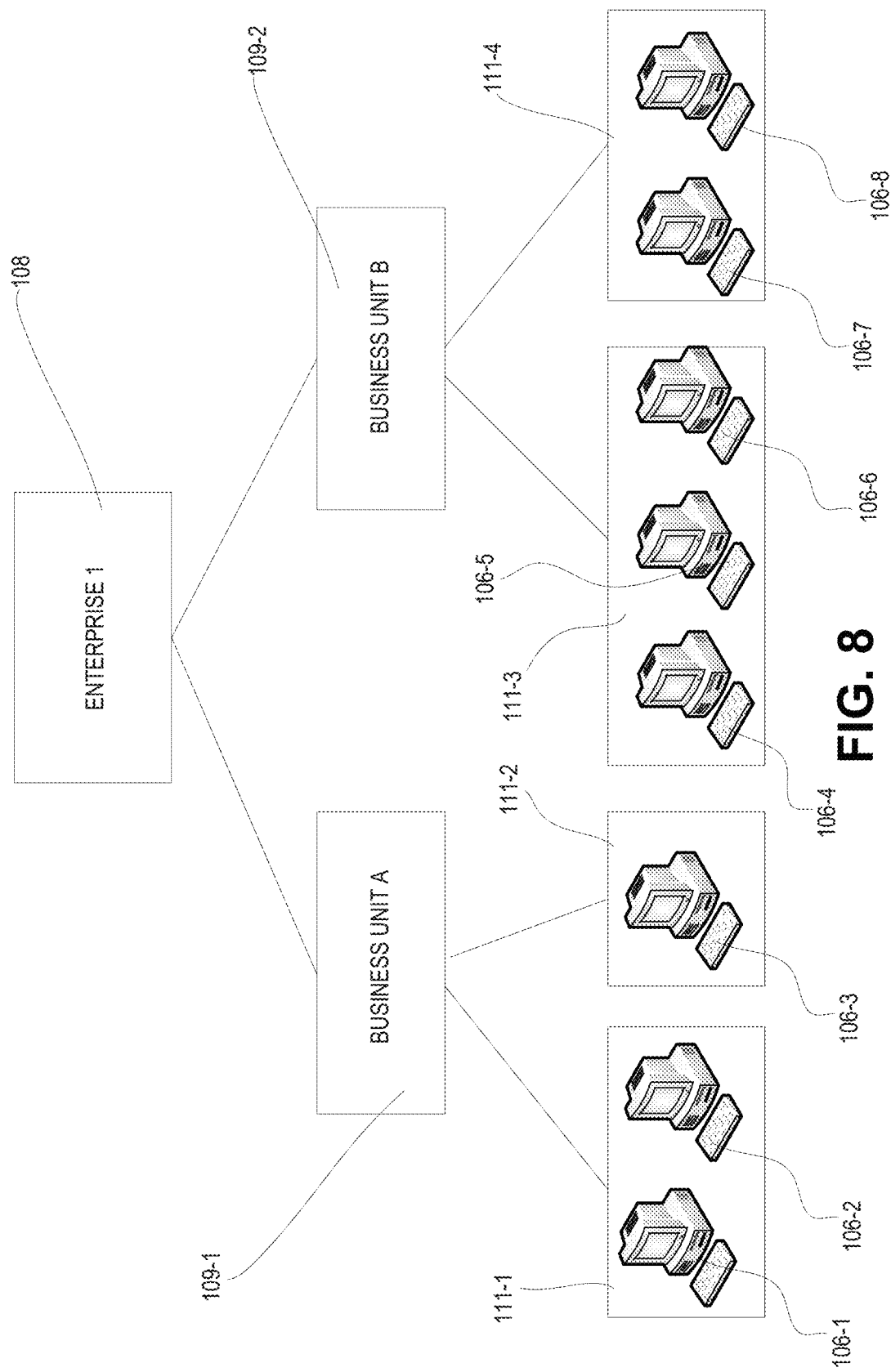
FIG. 8 is a schematic diagram of a tenant hierarchy of the system of FIG. 1.

FIG. 8 depicts an example hierarchy. As depicted, root tenant 108 includes all of the client computing devices 106 belonging to a particular organization. Root tenant 108 occupies a top hierarchical tier and corresponds to the organization 150. The second tier includes two sub-tenants 109-1, 109-2, each of which corresponds to a business unit within the organization. Each tenant 109 has one or more leaf tenants 111, each of which includes one or more client computing devices 106. Tenant 109-1 includes leaf tenants 111-1, 111-2 containing mobile computing devices 106-1, 106-2 and 106-3, respectively. Tenant 109-2 includes leaf tenants 111-3, 111-4 including client computing devices 106-4, 106-5, 106-6 and 106-7, 106-8, respectively. Computing system 100 may have more or fewer client computing devices 106, organized in more or fewer tiers.

In some embodiments, all root tenants have the same tiered organizational structure. In other embodiments, different root tenants have different organizational structures. For example, root tenants may have different numbers of tiers.

In some embodiments, distributed computing system 100 is accessed by multiple organizations. In some embodiments, each organization corresponds to a root tenant and has users grouped according to its own hierarchy of tenants. For example, one organization may correspond to a root tenant, and have second-tier tenants corresponding to business units, leaf tenants corresponding to departments within the business units, and individual users within the departments. Another organization may correspond to a different root tenant and have second-tier tenants corresponding to geographical locations, such as cities or buildings, leaf tenants corresponding to departments at each location, and individual users belonging to the departments.

In some embodiments, client computing devices 106 are permanently assigned to a tenant, for example, by virtue of being connected to a particular network. Additionally or alternatively, tenants can be defined as logical groupings, each containing a specific set of users with specific user credentials. In such cases, client computing devices 106 may be associated to a group or sub-group on entry of a user's credentials.

Figure 9A:
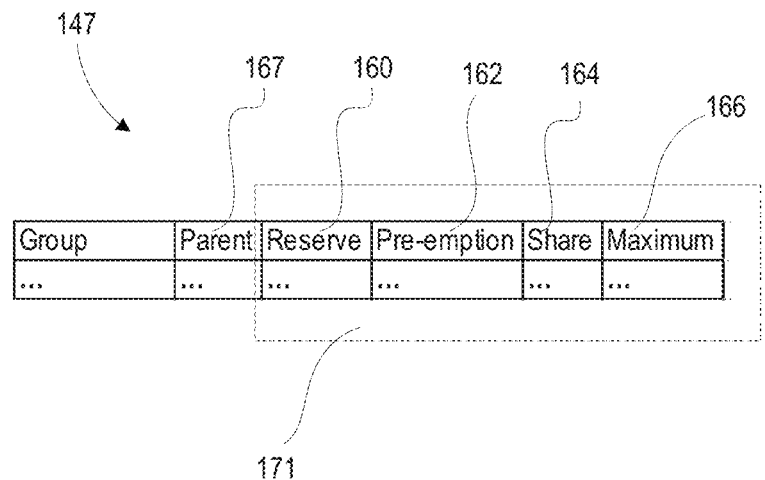
FIGS. 9A-9B are schematic diagrams of resource distribution policy tables of the system of FIG. 1.
Figure 9B:
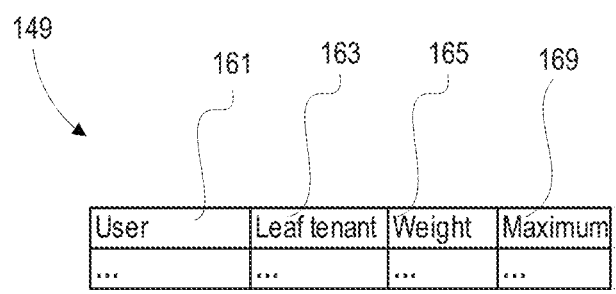

FIG. 9A depicts contents of policy structure 146. Policy structure 146 may be a database with one or more tables 147. Tables 147 include rows, each of which relates to a particular tenant and contains a plurality of values defining entitlement of the tenant to resources of computing system 100.

As depicted, each row of table 147 includes values in a reserve field 160, a minimum field 162, a share field 164 and a maximum field 166 (collectively, allocation values 171). Each row further contains a parent field 167 which identifies a parent tenant. For root tenants, parent field 167 may contain a null value.

Reserve field 160 contains a value defining the quantity of resources dedicated exclusively to the tenant, referred to as "reserved resources". A tenant is assigned its reserved resources independently of the tenant's demand. That is, a tenant is assigned its reserved resources even if the tenant's demand for resources is less than the quantity of resources, or if the tenant's demand is zero. The reserved resources need not correspond to specific physical resources; rather, reserved resources may be any appropriate resources within computing system 100.

Minimum field 162 defines a resource quantity to which a particular tenant is guaranteed access. A tenant can pre-empt other in-progress workloads in order to access resources up to its minimum amount.

Share field 164 defines a resource quantity to which a particular tenant is entitled, without rights to pre-empt other workloads. In other words, a tenant or user may demand resources up to its share value, but if such resources are no available for allocation, the tenant or user must wait until resources are free.

In some examples, share field 164 contains a value defining a proportion of available resources. For example, a tenant may have a share value of 50% indicating that the tenant is to be allocated half of the resources available to its parent.

In some circumstances, proportional values translate into allocations of very small or very large resource quantities. For example, if a large quantity of resources are available to a parent tenant, a child tenant's proportional share will be correspondingly large.

Maximum field 166 defines a limit to resource consumption by a tenant. Resources allocated to a tenant will not exceed the maximum value, even if more resources are available.

For example, a tenant may have a share value of 50% and a maximum value of 4 processor cores. If 20 processor cores are allocated to the tenant's parent, only 4 cores would be allocated to the tenant, notwithstanding that its proportional share would be 10 cores.

Typically, the value of minimum field 162 is larger than that of reserve field 160, the value of share field 164 is larger than that of minimum field 162, and the value of maximum field 166 is larger than that of share field 164.

Each of reserve field 160, minimum field 162, share field 164 and maximum field 166 may contain absolute values or proportional values, such as percentages. Absolute values define a quantity of resource units, for example, a number of processor cores. Proportional values define resource entitlement in terms of a share of resources allocated to a parent tenant or group. For example, a particular tenant may have absolute values defining, for example, a minimum allocation of 10 processor cores. A group of that tenant may have a proportional value of 50%, meaning it is entitled to half of its parent's 10 processor cores.

Defining one or more of allocation values 171 in terms of proportional values such as percentages may provide for ease of scalability of computing system 100. If the quantity of resources available increases or decreases, the resources allocated based on a proportional value will increase or decrease correspondingly.

In some embodiments, reserve field 160, pre-emption field 162, share field 164 and maximum field 166 contain different types of values. In an example embodiment, for some tenants, reserve field 160, pre-emption field 162 and share field 164 are defined as a proportion of resources available to a parent tenant, and maximum field 166 is defined as an absolute value.

Some tenants may have null values for one or more of reserve field 160, pre-emption field 162 and maximum field 166.

In some embodiments, tables 147 of policy structure 146 include allocation values for each type of resource within computing system 100. For example, if computing system 100 has server resources such as processor cores and memory, and other resources such as application licenses, network bandwidth and the like, each tenant may have a single set of reserve, pre-emption, share and maximum values that applies to every type of resource. Alternatively, each tenant may have a separate set of reserve, pre-emption, share and maximum values for each resource type. A tenant, may for example, be entitled to 50% of the processor core allocation of its parent group, but only 25% of the network bandwidth allocation.

In some embodiments, table 147 includes rows corresponding to individual users. In such embodiments, users may have allocation values 171 corresponding to those of tenants, that is, a reserve field 160, a minimum field 162, a share field 164 and a maximum field 166. In other embodiments, entries for individual users are contained in a separate table 149. As depicted, user table 149 includes rows for users, containing a user ID field 161, a leaf tenant field 163 identifying the leaf tenant to which a user belongs, a weight field 165 for defining a relative weighting of the user for resource allocation, and a maximum field 169 for defining a maximum resource quantity that can be assigned to a user.

In some embodiments, maximum field 169 is multi-dimensional or multiple maximum fields are present, for defining maximum values of multiple resource types.

In some embodiments, not all users are included in table 149. In such embodiments, users which do not have records in table 149 may be assigned a "default" profile. Alternatively, such users may be collectively treated as part of an "others" group policy.

As will be apparent, the set of allocation values 171 allows for tenants or users to be provided access to resources in accordance with a variety of possible service levels. Reserve value 160 allows for a set quantity of resources to be reserved for exclusive use by a particular tenant or user. Pre-emption value 162 allows for a tenant or user to be given priority access, but not exclusive access, to a set quantity of resources, such that workloads from that tenant or user may pre-empt workloads from other tenants or users. Share value 164 allows for tenants and users to share resources according to demand. Maximum value 166 allows for resource consumption by any user or tenant to be capped. Capping resource consumption may be useful, for example, to avoid excess charges in cases where tenants are charged according to resources consumed. In the absence of resource caps, a particular tenant or user could be assigned a large quantity of resources if, for example, demand from other users and tenants is low and a large quantity of resources are available. Such allocation could be problematic if, for example, tenants were charged based on resources assigned.

Inclusion of policy values for users allows for detailed sharing rules as between users of a particular leaf tenant, rather than simply sharing strictly on a demand basis. In an example embodiment, users known to be performing critical or time-sensitive functions are given higher weighting in order to provide access to a larger quantity of resources. Moreover, because users can be assigned a default profile or assigned to a default group, explicit values need not be defined for each user. Rather, in some embodiments, high weighting values are defined only for those users requiring greater resource access.

Figure 10:
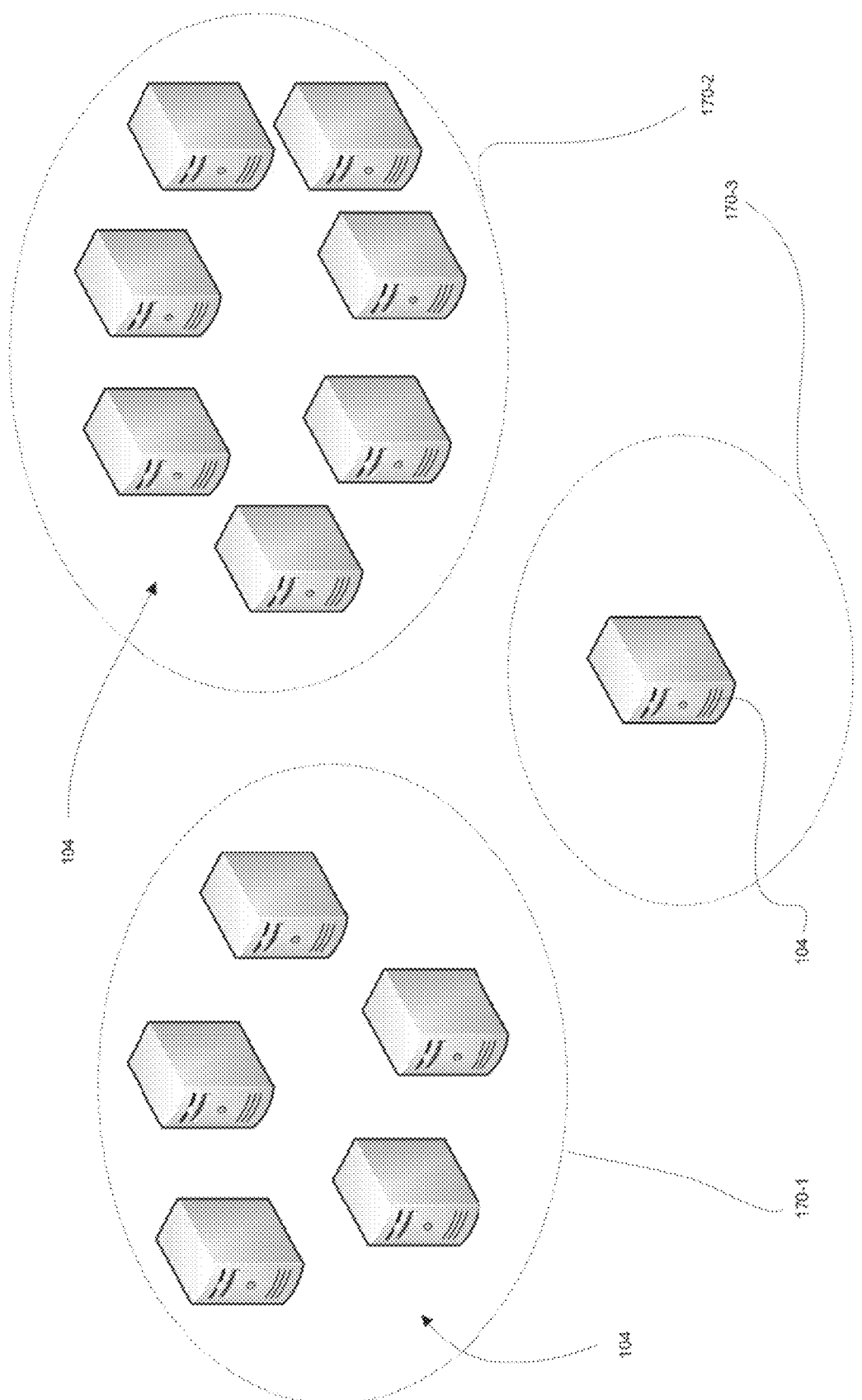
FIG. 10 is a schematic diagram of resource pools of the system of FIG. 1.

In some embodiments, resources of computing system 100 are physically or logically partitioned into multiple resource pools. For example, FIG. 10 depicts a computing system 100 with 13 resource servers 104. The resource servers 104 are partitioned into three resource pools 170-1, 170-2, 170-3. That is, servers 104-1 through 104-5 are part of resource pool 170-1; servers 104-6 through 104-12 are part of resource pool 170-2; and server 104-13 is part of resource pool 170-3. Resource pool 170-3 is a "default" resource pool containing any resources not explicitly assigned to another resource pool.

Each resource pool 170 has its own policy structure 146. Each policy structure 146 of a resource pool 170 defines a subset of tenants with access to that resource pool 170. Tenants or users may have entries in policy structures 146 of multiple resource pools 170. That is, tenants or users may have access to resources of multiple resource pools. Some tenants or users may have different policy values in different resource pools. Some tenants may have access to resources in all resource pools 170. Other tenants may have access to resources in only a subset of resource pools 170.

In other embodiments, a single policy structure 146 contains allocation values for each resource pool 170 within tables 147.

Partitioning of computing system 100 into multiple resource pools 170 may allow for different resources to be shared according to different rules. For example, computing system 100 may include a resource pool 170 including resource servers 104 owned by a particular root tenant. That root tenant may be given a large reserve value 160 or pre-emption value 162 in that resource pool, but not in other resource pools. In other examples, certain resource pools 170 may include resources specialized for specific types of workloads. Such resource pools 170 may be accessible only by a subset of tenants or users likely to have such workloads.

Partitioning of computing system 100 into multiple resource pools may also provide for ease of scalability. For example, partitioning computer system 100 allows additional resource servers 104 or other resources to simply be added to computing system 100 as a new resource pool 170, with its own policy structure. Conversely, removing resource servers 104 or other resources can be done by simply removing a resource pool 170 and its associated policy structure 146.

Figure 11:
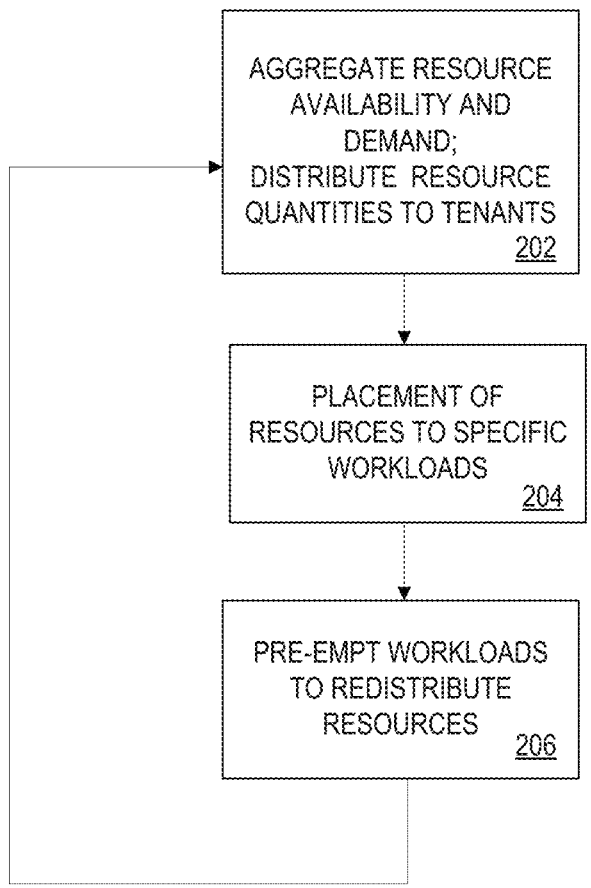
FIG. 11 is a flow chart of a resource allocation process.

FIG. 11 depicts an example method of resource allocation within computing system 100. Resource allocation is directed my master server 102 under control of distributed resource manager 126. Resource allocation may be performed periodically, for example at a fixed interval of 1 second or another interval suitable to typical workloads carried out in computing system 100. If workloads are frequently completed very quickly, a short interval permits idle resources to be quickly re-assigned. Conversely, if workloads frequently take a longer time to complete, a longer interval avoids or limits unnecessary or inefficient operation of distributed resource manager 126.

At block 202, distributed resource manager 126 of master server 102 aggregates resource requests to determine resource demand in computing system 100 and aggregates resource availability within each resource pool. Distributed resource manager 126 evaluates resource demands and availability to assign resource quantities to workloads from client computing devices based on policy structure 146.

At block 204, distributed resource manager 126 performs a placement process to task specific resources to perform workloads. The placement process may be iterative.

At block 206, distributed resource manager 126 performs a pre-emption check and reassigns resources to workloads from tenants that have not yet been allocated their respective pre-emption quantity of resources.

At block 208, distributed resource manager 126 waits for a predetermined scheduling interval before returning to block 202 to repeat the resource allocation process.

Figure 12:
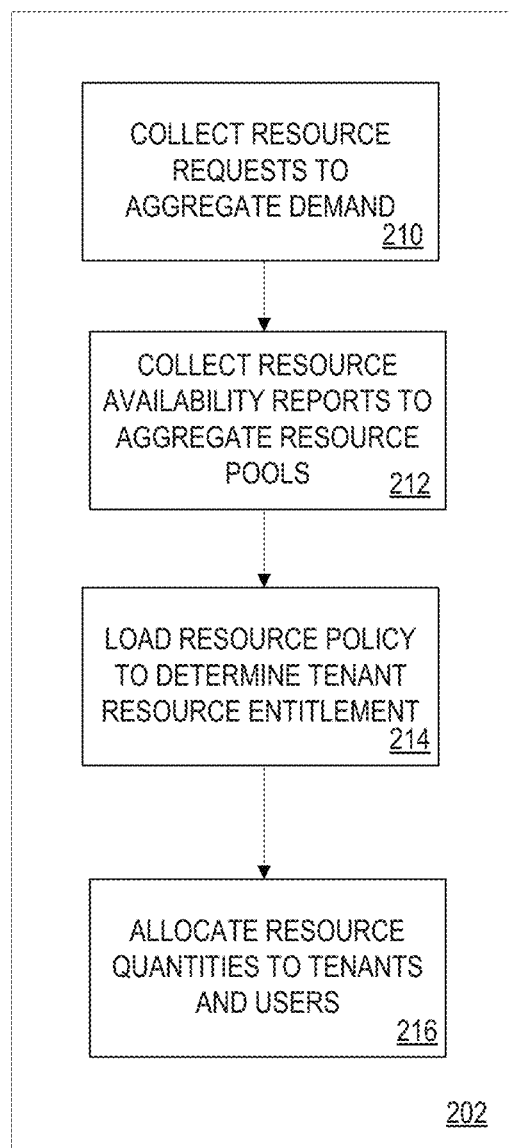
FIGS. 12-14 are flow charts of a distribution process.

FIG. 12 depicts the distribution process of block 202 in greater detail. Users log on to client computing devices 106 to perform computing tasks within computing system 100.

In the course of performing such tasks, users may select files, applications, functions or the like from computing devices 106. Such files, applications, functions or the like are invoked, for example, by commands entered through an interface, API calls, etc.

Instructions to perform computing tasks are received by DRM daemons 134 running at computing devices 106. The instructions may include, for example, user commands, API calls and the like. DRM daemons 134 send messages to master server 102 for requesting resources to perform workloads based on the instructions. Messages sent to master server 102 may define specific resources required (e.g. number of processor cores), or a workload to be performed. A workload may be defined in terms of the application to be used, amount and type of processing required, etc.

At block 210, demand collection module 130 of master server 102 collects resource request messages from client computing devices 106 in order to aggregate total demand for resources. Resource demands are recorded for each user and recursively calculated for each leaf tenant, tenant and root tenant. That is, the demand of a particular leaf tenant is the sum of demands of users belonging to that leaf tenant. The demand of the leaf tenant's parent is the sum of demands of all leaf tenants belonging to the parent. Likewise, the demand of a root tenant is the sum of the demand of all tenants belonging to the root tenant.

At block 212, resource collection module 128 of master server 102 likewise communicates with DRM agents 132 to aggregate available resources within computing system 100.

Typically, at any given time, a subset of resources within a resource pool 170 are idle and available for distribution, while another subset are occupied and performing workloads. DRM agents 132 report resources available for allocation to distributed resource manager 126.

Aggregation of resources is done per resource pool. That is, resources available in each resource pool 170 are calculated separately.

At block 214, distributed resource manager 126 of master server 102 loads policy structure 146 to determine tenant resource entitlements. Resource entitlements are determined beginning with root tenants and progressively moving down the hierarchy to individual users. Distributed resource manager adjusts the allocation values 171 for each tenant based on aggregated resource availability and demand. For example, allocation values 171 that are defined as percentages may be converted to absolute values. That is, if a root tenant is assigned 10 processor cores, a value of 30% for one of its sub-tenants is converted to 3 processor cores. Adjustment of policy values is done from top to bottom, i.e., beginning with root tenants and progressing downwardly through the hierarchy to individual users.

Figure 13:
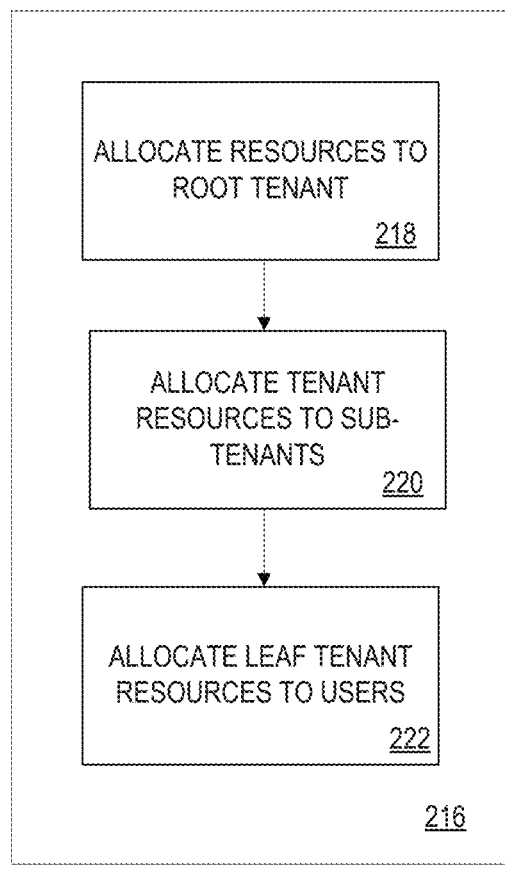

At block 216, distributed resource manager 126 assigns resource quantities to each tenant according to the adjusted allocation values. Resource allocation progresses down the tenant hierarchy, as depicted in FIG. 13. At block 218, available resources in the resource pool are assigned to root tenants. At block 220, resources assigned to each root tenant are distributed among its respective sub-tenants. Block 220 repeats if the hierarchy includes multiple levels of sub-tenants, until resources are allocated to leaf tenants. At block 222, resources of leaf tenants are assigned to their respective users for use to perform workloads from the leaf tenants.

In some embodiments, resource quantities are assigned one resource pool at a time. That is, resources of a first resource pool are assigned to tenants, leaf tenants and users before resources of a second resource pool are assigned. Resource demands of tenants and users are updated after the assignment of each resource pool is completed. For example, a tenant that demanded 6 processor cores and that has access to first and second resource pools may be assigned 4 processor cores from the first resource pool. That tenant's demand would then be updated to reflect the outstanding demand, namely 2 processor cores. This approach may avoid double-allocating resources.

In other embodiments, assignment of resources in different resource pools are performed in parallel. This approach may allow for faster assignment of resources.

Figure 14:
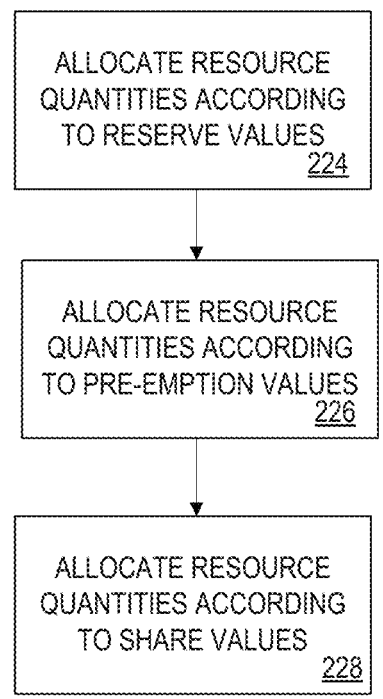

FIG. 14 depicts a process used by distributed resource manager 126 to assign resources among tenants at the same hierarchy level. The process of FIG. 14 is followed at each of blocks 218, 220, 222 (FIG. 13), i.e. for assignment of resources to each of root tenants, sub-tenants (including leaf tenants) and users.

At block 224, for each tenant within a hierarchy level, distributed resource manager 126 assigns a quantity of resources up to the tenant's respective reserve value, if possible. For example, if a resource pool has 10 available processor cores and three root tenants have access, of which a first tenant has a reserve value of 3, three processor cores will be assigned to the first tenant, leaving 7 available for distribution. Reserved resources are allocated to a tenant even if the tenant has not demanded such allocation.

At block 226, distributed resource manager 126 assigns the remaining resources to each tenant, in accordance with each tenant's demand, up to the tenant's pre-emption value. For example, if a tenant has demanded 6 processor cores and has a pre-emption entitlement of 3 processor cores, it will be allocated 3 processor cores, if possible.

At block 228, distributed resource manager 126 assigns the remaining resources to each tenant, in accordance with each tenant's demand, up to the tenant's share value. The amount assigned to a given tenant is also limited to the tenant's maximum allocation. In an example, a tenant's share value is 50% of its parent's allocation, and its maximum allocation is 4 processor cores. If the tenant's parent has 10 processor cores allocated and available, the tenant will be assigned 4 cores, notwithstanding that its share of its parent's allocation is 5 cores.

In some embodiments, distribution of resources to users follows the process depicted in FIG. 14. Alternatively, in embodiments in which users are assigned only weight and maximum values, each user within a leaf tenant is assigned the lowest of its demand, its maximum resource value and a proportional share of resources available to the leaf tenant, based on the ratio of the user's weight value to the total weight of users in the leaf tenant.

In some embodiments, resources are assigned to users in priority order according to weight values. That is, resources are assigned to users in descending order of weight, such that the highest-weight user is assigned resources up to its demand or its maximum value, and subsequent users are then assigned resources up to their respective demand or maximum value, in descending order of weight.

FIG. 15 depicts example pseudo-code for implementing the process depicted in FIGS. 12-14.

Referring again to FIG. 11, once resources are allocated to tenants at distribution block 202, distributed resource manager 126 proceeds to match specific resources (e.g., specific processor cores of resource servers 104) with specific client computing devices 106 or workloads of client computing devices 106.

Resources may be matched by selecting a tenant, selecting a workload request (e.g. processing request) from that tenant, and selecting a resource (e.g. a specific resource server 104 of processor).

In some embodiments, resources are assigned in a round-robin manner, such that tenants alternate assigning resources to their workloads. Such an approach may promote even distribution of resources among tenants. In other embodiments, resources are distributed among tenants in a pre-set sequence, for example, so that a particular tenant is given high priority.

Referring to FIG. 11, at block 206, distributed resource manager 126 determines if a tenant or user has been allocated less than its reserved quantity of resources, for example, by comparing allocated resource values to reserve values 160.

If any tenant or user has been allocated less than its reserved resource quantity, distributed resource manager 126 selects resources occupied with one or more existing workloads for re-assignment to that tenant or user.

In some embodiments, selection of workloads to be pre-empted is done by selecting tenants and users based on a comparison of their respective reserve value 160 or minimum value 162 to resources allocated. The selection progresses down the tenant hierarchy. That is, the resources allocated to each root tenant 108 are compared to the root tenant's reserve value 160 or minimum value 162 and the amount, if any, by which the allocated resources exceed the reserve value 160 or minimum value 162, referred to as excess allocation. The root tenant 108 with the highest excess allocation is selected for pre-emption of resources. The same process is repeated with sub-tenants belonging to the selected root tenant, and, in turn, with children of selected sub-tenants, until a leaf tenant is selected. A user belonging to the selected leaf tenant is then selected for pre-emption. The selected user may be the user with the highest excess allocation. Alternatively, the selected user may be the user with the highest resource allocation, or the user with the lowest weighting value. A workload of the selected user is interrupted and resources previously allocated to that workload are re-allocated to the tenant or user with unmet reserve value 160. Selection of additional workloads is repeated as necessary until the reserve value 160 is met.

Distributed resource manager 126 then sends messages to DRM agents 132 associated with the selected resources and thereby instruct processing of the selected workloads to be interrupted. Distributed resource manager 126 then re-allocates the selected resources to the tenant or user which has been allocated less than its reserve value 160.

Distributed resource manager 126 repeats the process of FIG. 11 at predefined intervals. In some embodiments, the interval between distribution rounds is approximately 1 second. However, in other embodiments, the interval may be longer or shorter. The interval may limit redundant operation of distributed resource manager 126. For example, once resources are assigned to perform specific workloads, delaying the distribution round may allow for some resources to complete workloads and thus be freed for re-assignment. Conversely, if distributed resource manager were to immediately begin another distribution round without a wait interval, many resources would be busy performing workloads to which they had just been assigned.

In other embodiments, distribution rounds are triggered by changes in demand signalled by messages from DRM daemons 134.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the detailed embodiments described above and illustrated are intended to be examples only. The invention is defined by the appended claims.

What is claimed is:

1. A method of resource allocation in a distributed computing system comprising a plurality of tenants organized in a tiered hierarchy, the plurality of tenants including a root tenant associated with at least two sub-tenants, and each sub-tenant of the two sub-tenants associated with one or more corresponding leaf tenants, the method comprising:
   receiving, at a distributed resource manager, a plurality of requests from said plurality of tenants for allocation of quantities of resources to workloads of said tenants;
   allocating, at the distributed resource manager, said quantities of resources to said workloads of said plurality of tenants in accordance with a distribution policy, the distribution policy defining a resource entitlement for each of said one or more corresponding leaf tenants and defining a hierarchical resource entitlement for each of the at least two sub-tenants, said resource entitlement for each of the plurality of tenants including a guaranteed quantity of resources for said each of the plurality of tenants; and
   in response to determining, at the distributed resource manager, that a first quantity of resources allocated for workloads of a first sub-tenant of said plurality of tenants is less than the guaranteed quantity of resources for said first sub-tenant:
      selecting, by the distributed resource manager, a second sub-tenant from among said plurality of tenants based on a comparison of said guaranteed quantity of resources for said second sub-tenant and a quantity of resources allocated to workloads of said second sub-tenant, and
      interrupting processing of a workload of said second sub-tenant prior to completing processing of said workload of said second sub-tenant and re-allocating the quantity of resources allocated to said workload of said second sub-tenant to a workload of said workloads of said first sub-tenant.

2. The method of claim 1, wherein said resource entitlement for the each of the plurality of tenants comprises a reserve quantity of resources for the each of the plurality of tenants, and wherein allocating quantities of resources comprises allocating said reserve quantity of resources to workloads of each of said plurality of tenants independently of a quantity of resources requested by said workloads of each of said plurality of tenants.

3. The method of claim 1, wherein said resource entitlement for the each of the plurality of tenants includes a maximum quantity of resources for the each of the plurality of tenants, and wherein said allocating comprises allocating quantities of resources to workloads of each tenant its maximum quantity of resources, wherein said maximum quantity of resources is less than a quantity of idle resources available for allocation to workloads of said plurality of tenant.

4. The method of claim 1, wherein said distribution policy comprises resource allocation weightings for users belonging to ones of said tenants.

5. The method of claim 4, wherein said allocating quantities of resources comprises allocating said quantities of resources to workloads for said users according to said resource allocation weightings.

6. The method of claim 1, wherein said guaranteed quantity of resources for each tenant comprises a proportional share of available resources.

7. The method of claim 1, wherein said guaranteed quantity of resources for each tenant comprises an absolute value defining a number of resource units.

8. The method of claim 1, wherein said guaranteed quantity of resources for each tenant comprises a proportional value of available resources and an absolute value defining a number of resource units.

9. The method of claim 1, wherein said distributed computing system comprises resources in a plurality of resource pools, and wherein said allocating comprises allocating resources of a first resource pool to a first set of said plurality of tenants and allocating resources of a second resource pool to a second set of said plurality of tenants.

10. The method of claim 9, wherein at least one tenant is part of both said first set of said plurality of tenants and said second set of said plurality of tenants.

11. The method of claim 9, further comprising defining a data structure defining a distribution policy for each tenant of each one of said first and second resource pools.

12. A master server of a distributed computing system comprising a plurality of resource servers, the master server comprising:
a resource collection module for receiving messages identifying available resources associated with said resource servers;
a demand collection module for receiving messages identifying resource requests from a plurality of tenants of said distributed computing system, the plurality of tenants organized in a tiered hierarchy, the plurality of tenants including a root tenant associated with at least two sub-tenants, and each sub-tenant of the two sub-tenants associated with one or more corresponding leaf tenants;
a data structure comprising a distribution policy for said available resources, said distribution policy containing a resource entitlement for each of said one or more corresponding leaf tenants and defining a hierarchical resource entitlement for each of the at least two sub-tenants, said resource entitlement for each of the plurality of tenants including a guaranteed quantity of resources for said each of the plurality of tenants;
a distributed resource manager for:
determining that a first quantity of resources allocated for workloads of a first sub-tenant of said plurality of tenants is less than the guaranteed quantity of resources for said first sub-tenant;
selecting a second sub-tenant from among said plurality of tenants based on a comparison of said guaranteed quantity of resources for said second sub-tenant and a quantity of resources allocated to workloads of said second sub-tenant; and
interrupting processing a workload of said second sub-tenant prior to completing processing of said workload of said second sub-tenant and re-allocating the quantity of resources allocated to said workload of said second sub-tenant to a workload of said workloads of said first sub-tenant.

13. The master server of claim 12, wherein said resource entitlement for the each of the plurality of tenants comprises a reserve quantity of resources for the each of the plurality of tenants, and wherein allocating said quantities of resources comprises allocating said reserve quantity of resources to workloads of each of said plurality of tenants independently of a quantity of resources requested by said workloads of each of said tenants.

14. The master server of claim 12, wherein said resource entitlement for the each of the plurality of tenants includes a maximum quantity of resources for the each of the plurality of tenants, wherein said quantities of resources to workloads of each tenant are allocated its maximum quantity of resources, and wherein said maximum quantity of resources is less than a quantity of idle resources available for allocation to workloads of the each of the plurality of tenants.

15. The master server of claim 12, wherein said distribution policy comprises resource allocation weightings for users belonging to ones of said tenants.

16. The master server of claim 12, wherein said guaranteed quantity of resources for each tenant comprises a proportional share of available resources.

17. The master server of claim 12, wherein said guaranteed quantity of resources for each tenant comprises an absolute value defining a number of resource units.

18. The master server of claim 12, wherein said guaranteed quantity of resources for each tenant comprises a proportional value of available resources and an absolute value defining a number of resource units.

19. The master server of claim 12, wherein said available resources comprise resources in a plurality of resource pools.

20. The master server of claim 19, wherein said data structure comprises a distribution policy for each tenant of each one of said plurality of resource pools.

21. The master server of claim 20, wherein said distribution policy for a first resource pool of said plurality of resource pools defines a first set of said plurality of tenants with access to said first resource pool of said plurality of resource pools, and said distribution policy for a second resource pool of said plurality of resource pools defines a second set of said plurality of tenants with access to said second resource pool of said plurality of resource pools.

22. The master server of claim 21, wherein at least one tenant is part of both a first group and a second group.

23. A non-transitory computer-readable medium storing instructions which when executed by at least one processor causes the at least one processor to:
receive a plurality of requests from a plurality of tenants for allocation of quantities of resources to workloads of said tenants, the plurality of tenants organized in a tiered hierarchy, the plurality of tenants including a root tenant associated with at least two sub-tenants, and each sub-tenant of the two sub-tenants associated with one or more corresponding leaf tenants;
allocate said quantities of resources to said workloads of said plurality of tenants in accordance with a distribution policy, the distribution policy defining a resource entitlement for each of said one or more corresponding leaf tenants and defining a hierarchical resource entitlement for each of the at least two sub-tenants, said resource entitlement for each of the plurality of tenants including a guaranteed quantity of resources for said each of the plurality of tenants; and in response to determining that a first quantity of resources allocated for workloads of a first sub-tenant of said plurality of tenants is less than the guaranteed quantity of resources for said first sub-tenant:
  selecting a second sub-tenant from among said plurality of tenants based on a comparison of said guaranteed quantity of resources for said second sub-tenant and a quantity of resources allocated to workloads of said second sub-tenant, and
  interrupting processing of a workload of said second sub-tenant prior to completing processing of said workload of said second sub-tenant and re-allocating the quantity of resources allocated to said workload of said second sub-tenant to a workload of said workloads of said first sub-tenant.

\* \* \* \* \*